United States Patent
Byun et al.

(10) Patent No.: US 10,279,763 B2
(45) Date of Patent: May 7, 2019

(54) BEAM FOR BUMPER

(71) Applicant: LG Hausys, Ltd., Seoul (KR)

(72) Inventors: Kye-Woong Byun, Gwacheon-si (KR); Yong-Han Kang, Seoul (KR); Dong-Won Kim, Gwangmyeong-si (KR); Hyun-Jin Choi, Ansan-si (KR); Hee-June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 15/750,268

(22) PCT Filed: Jun. 21, 2016

(86) PCT No.: PCT/KR2016/006553
§ 371 (c)(1),
(2) Date: Feb. 5, 2018

(87) PCT Pub. No.: WO2017/022948
PCT Pub. Date: Feb. 9, 2017

(65) Prior Publication Data
US 2018/0222415 A1    Aug. 9, 2018

(30) Foreign Application Priority Data
Aug. 5, 2015    (KR) .......................... 10-2015-0110768

(51) Int. Cl.
*B60R 19/18*    (2006.01)
*B60R 19/03*    (2006.01)
*B60R 19/24*    (2006.01)

(52) U.S. Cl.
CPC .............. *B60R 19/03* (2013.01); *B60R 19/18* (2013.01); *B60R 19/24* (2013.01); *B60R 2019/247* (2013.01)

(58) Field of Classification Search
CPC ......... B60R 19/18; B60R 19/03; B60R 19/24; B60R 2019/247; B60R 19/34
(Continued)

(56) References Cited

U.S. PATENT DOCUMENTS

| 5,122,398 A |   | 6/1992 | Seiler et al. |
| 6,231,094 B1 | * | 5/2001 | Uytterhaeghe ......... B29C 43/02 264/257 |

(Continued)

FOREIGN PATENT DOCUMENTS

| KR | 10-2002-0052911 A | 7/2002 |
| KR | 10-2010-0109249 A | 10/2010 |

(Continued)

OTHER PUBLICATIONS

International Search Report for PCT/KR2016/006553 dated Sep. 29, 2016.

*Primary Examiner* — Pinel E Romain
(74) *Attorney, Agent, or Firm* — Hauptman Ham, LLP

(57) ABSTRACT

Disclosed herein is a beam for a bumper. The beam includes: a rail member installed on a body of a vehicle, wherein the rail member is formed by processing a continuous fiber thermoplastics (CFT) into a rail shape and has a coupling portion having a flange-shaped coupling surface; a stay member disposed at the either side portion of the rail member in the longitudinal direction so that it is located between the body and the rail member, wherein the stay member is formed by processing the continuous fiber thermoplastics (CFT) into a stay shape, and is coupled with the rail member such that a coupling surface having a flange shape in parallel with the coupling surface of the coupling portion is coupled with it; and a fastening plate disposed between the coupling portion and the stay member to enhance rigidity of the coupling surface of the stay member.

5 Claims, 7 Drawing Sheets

(58) Field of Classification Search
USPC .......................................................... 293/120
See application file for complete search history.

(56) References Cited

U.S. PATENT DOCUMENTS

| | | | | |
|---|---|---|---|---|
| 6,382,709 | B1* | 5/2002 | Chirifu | B60R 19/24 |
| | | | | 276/29 |
| 7,976,082 | B2* | 7/2011 | Song | B60R 19/34 |
| | | | | 293/133 |
| 9,481,333 | B2* | 11/2016 | Lee | B60R 19/18 |
| 10,017,140 | B2* | 7/2018 | Fuerst | B60R 19/03 |
| 2012/0025545 | A1* | 2/2012 | Haneda | B60R 19/18 |
| | | | | 293/102 |
| 2012/0141764 | A1* | 6/2012 | Lee | B60R 19/03 |
| | | | | 428/297.4 |
| 2013/0241219 | A1* | 9/2013 | Kaneko | B60R 19/34 |
| | | | | 293/133 |
| 2015/0298443 | A1* | 10/2015 | Hundley | B32B 38/1866 |
| | | | | 156/214 |
| 2015/0307044 | A1* | 10/2015 | Hundley | B60R 19/18 |
| | | | | 293/120 |
| 2016/0214284 | A1* | 7/2016 | Mankame | B32B 37/24 |
| 2017/0036624 | A1* | 2/2017 | Yabu | B60R 19/03 |
| 2017/0166148 | A1* | 6/2017 | Freundl | B60R 19/18 |

FOREIGN PATENT DOCUMENTS

| | | |
|---|---|---|
| KR | 10-2012-0061072 A | 6/2012 |
| KR | 10-1467032 B1 | 12/2014 |
| WO | WO2014-069108 A1 | 5/2014 |

* cited by examiner

BEAM FOR BUMPER

CROSS REFERENCE TO RELATED APPLICATION

This application claims the priority of Korean Patent Application No. 10-2015-0110768 filed on Aug. 5, 2015 in the Korean Patent and Trademark Office. Further, this application is the National Phase application of International Application No. PCT/KR2016/006553 filed on Jun. 21, 2016, which is incorporated herein by reference in its entirety.

BACKGROUND

1. Field of the Invention

The present disclosure relates to a beam for a bumper, and more particularly to a beam for a bumper for protecting the body of a vehicle from an external impact when an accident such as vehicle collision occurs.

2. Discussion of the Related Art

Typically, a bumper protects the body or functional parts of a vehicle in the event of a collision, while preventing damaging and improving the design of the body of the vehicle.

Such a bumper is required to meet the impact requirements of each country's regulations, to have high rigidity and excellent impact resistance in a wide temperature range, to have low expansion and contraction according to temperature, and to have good aerodynamic performance.

The basic structure of a rear bumper installed on the rear side of a vehicle includes a bumper cover for covering the entire lower portion of the rear side of the vehicle, an energy absorber formed of an elastic material such as polypropylene foam or urethane foam and for absorbing an impact energy applied from the outside, a back beam positioned at the rear of the bumper cover and for protecting the body of the vehicle from external collision, and a stay member and a side member for connecting the back beam to the body of the vehicle.

Among them, the back beam supports the energy absorber so that the energy absorber can sufficiently absorb the impact energy applied from the outside, and the back beam itself is also deformed and absorbs the external impact energy.

Typically, the back beam is made mainly of steel. There are shortcomings in that the weight of a vehicle is increased, and the driving performance and the fuel efficiency are deteriorated since the steel is heavy.

Recently, an attempt has been made to produce a part of or the entire back beam by plastic injection molding, to produce a back beam with increased design freedom and reduced weight. However, the back beam formed by the plastic injection molding has insufficient rigidity and exhibits low performance at a low temperature.

In this regard, Korean Patent Laid-Open Publication No. 10-2002-0052911 (published on Jul. 4, 2002) discloses a rear bumper for automobile.

An object of the present disclosure is to provide a beam for a bumper which has high rigidity, is light and prevents degradation in performance at a low temperature.

SUMMARY OF THE INVENTION

In accordance with one aspect of the present disclosure, a beam for a bumper includes: a rail member installed on a body of a vehicle, wherein the rail member is formed by processing a continuous fiber thermoplastics (CFT) into a rail shape and has a coupling portion having a flange-shaped coupling surface at its either side portion in a longitudinal direction; a stay member disposed at the either side portion of the rail member in the longitudinal direction so that it is located between the body and the rail member to be coupled with the coupling portion, wherein the stay member is formed by processing the continuous fiber thermoplastics (CFT) into a stay shape, and is coupled with the rail member such that a coupling surface having a flange shape in parallel with the coupling surface of the coupling portion is coupled with it; and a fastening plate disposed between the coupling portion and the stay member to enhance rigidity of the coupling surface of the stay member coupled with the body.

The coupling portion and the stay member may be coupled with each other by fusing or riveting them as the coupling surfaces are in contact with each other.

The beam may further include: a fastening member for coupling the coupling portion and the stay member with each other as the coupling surfaces are in contact with each other, wherein the fastening member comprises a rivet, wherein the rivet is pressed into the coupling surfaces between the coupling portion and the stay member from outside the coupling portion toward the stay member, and wherein an end of the pressed rivet widens outwardly to penetrate into the stay member to couple the coupling portion with the stay member.

The beam may further include: a body fastening member for penetrating the fastening plate and the coupling portion, and a fastening hole through which the body fastening member passes may be formed in the fastening plate.

The body fastening member may include: a guide pin coupled to the fastening plate and protruding toward the body through the fastening hole and/or a pop nut coupled to the coupling portion and the fastening plate through the fastening hole.

According to a beam for a bumper, a rail member and a stay member are entirely formed using only continuous fiber thermoplastics (CFT), so that there is provided the beam that has excellent rigidity and impact resistance while maintaining its physical properties even at a low temperature.

In addition, according to an exemplary embodiment of the present disclosure, the rail member and the stay member are entirely made of the continuous fiber thermoplastics (CFT) that is light, so that there is provided the beam that is light and strong while having excellent mechanical strength, rigidity, impact resistance and low-temperature characteristics.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
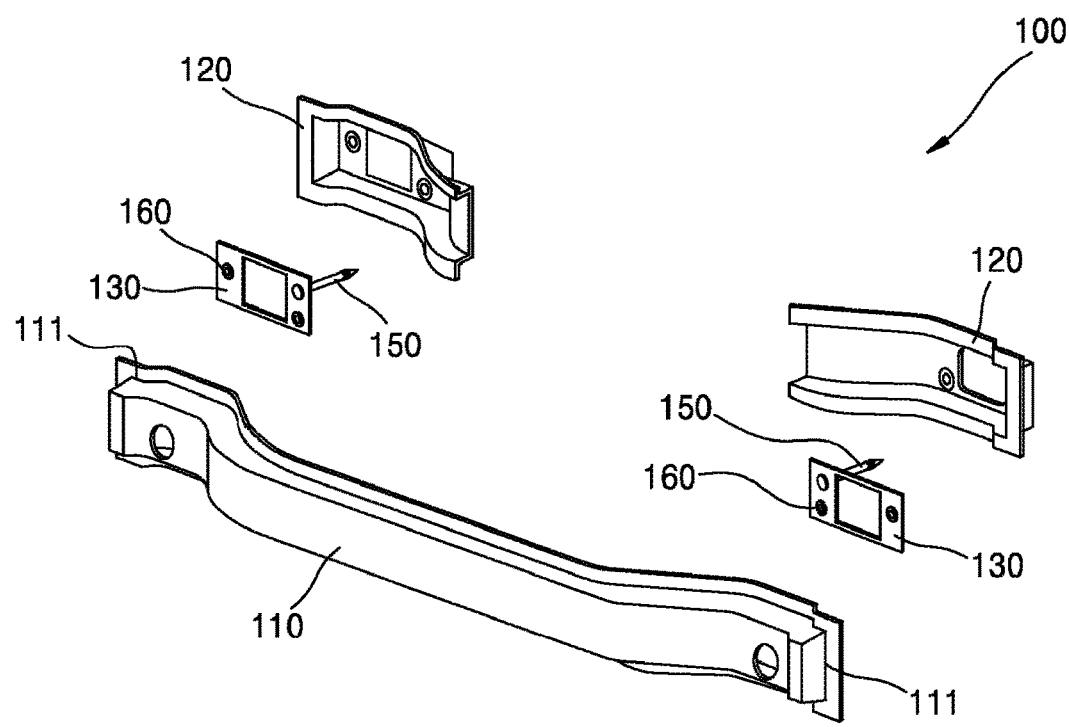
FIG. 1 is 1 is an exploded perspective view of a beam for a bumper according to an exemplary embodiment of the present disclosure.

Hereinafter, a beam for bumper according to an exemplary embodiment of the present disclosure will be described with reference to the accompanying drawings. In the drawings, the thickness of lines or the size of the elements may be exaggerated and not drawn on scale for the purposes of clarity and convenience. In the following description, the terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her invention in the best way. Therefore, the definition of such terminologies should be construed based on the contents throughout the specification.

Figure 2:
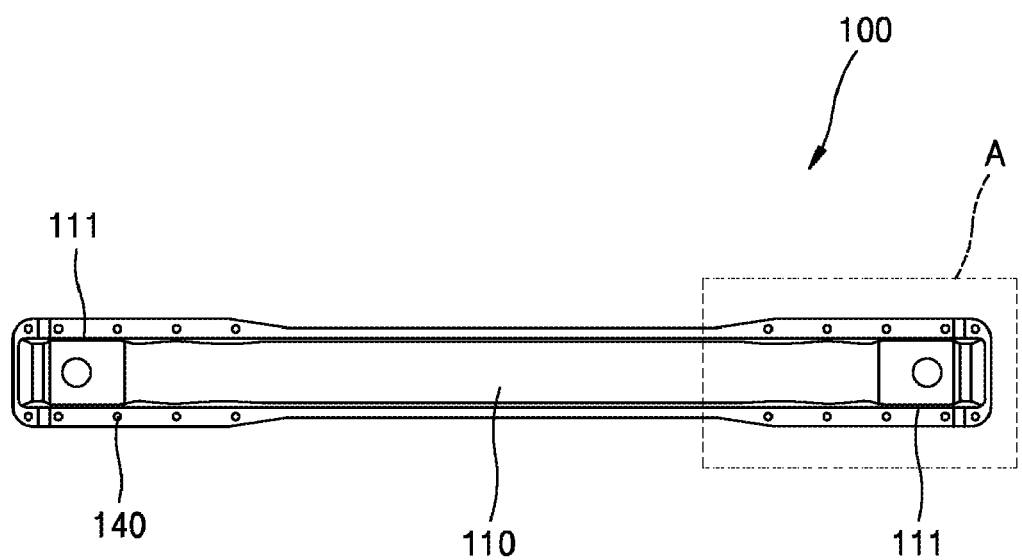
FIG. 2 is a front view of the beam for a bumper according to the exemplary embodiment of the present disclosure.
Figure 3:
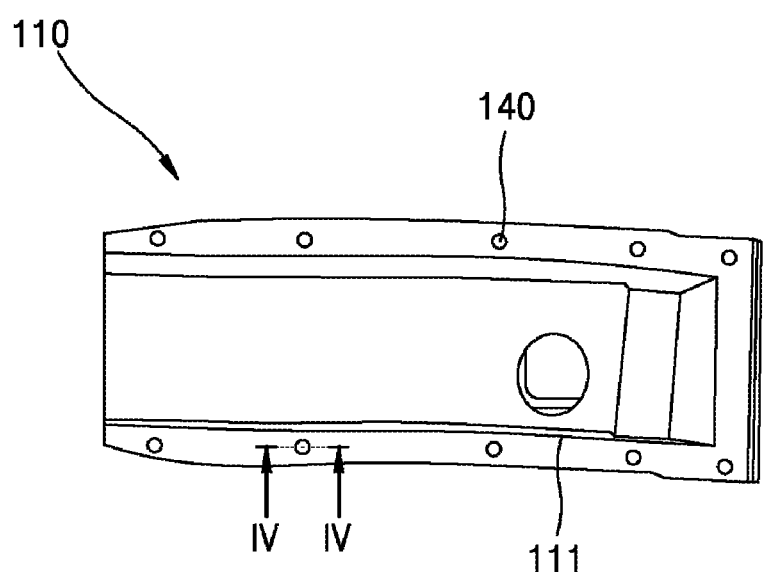
FIG. 3 is an enlarged view of portion A of FIG. 2.
Figure 4:
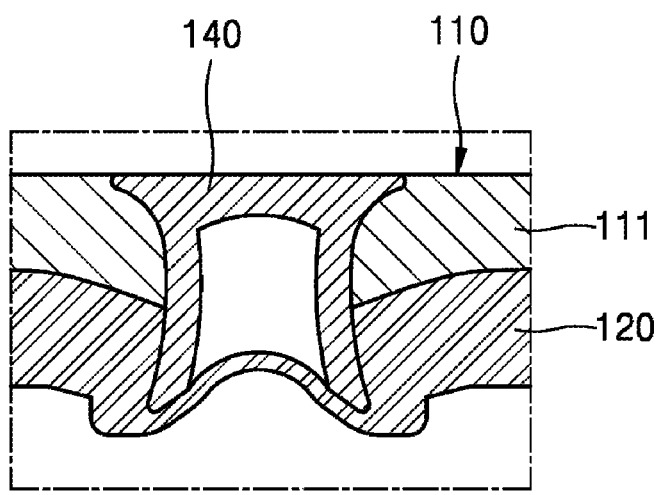
FIG. 4 is a cross-sectional view taken along line IV-IV shown in FIG. 3.
Figure 5:
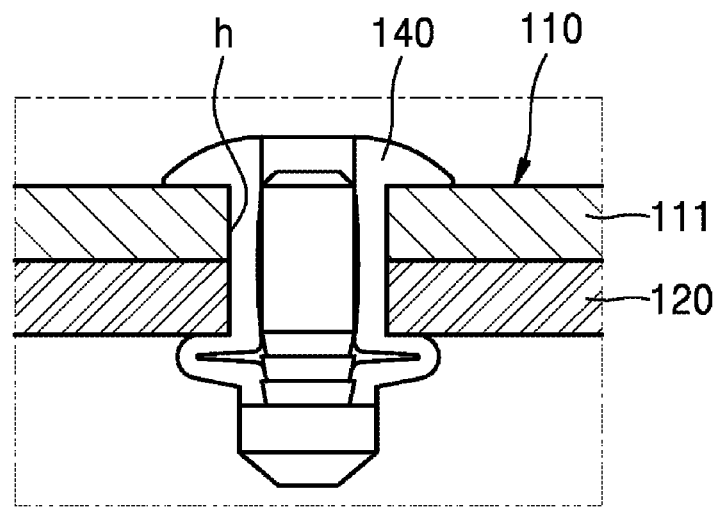
FIG. 5 is a view showing another example of coupling between a coupling portion and a stay member.
Figure 6:
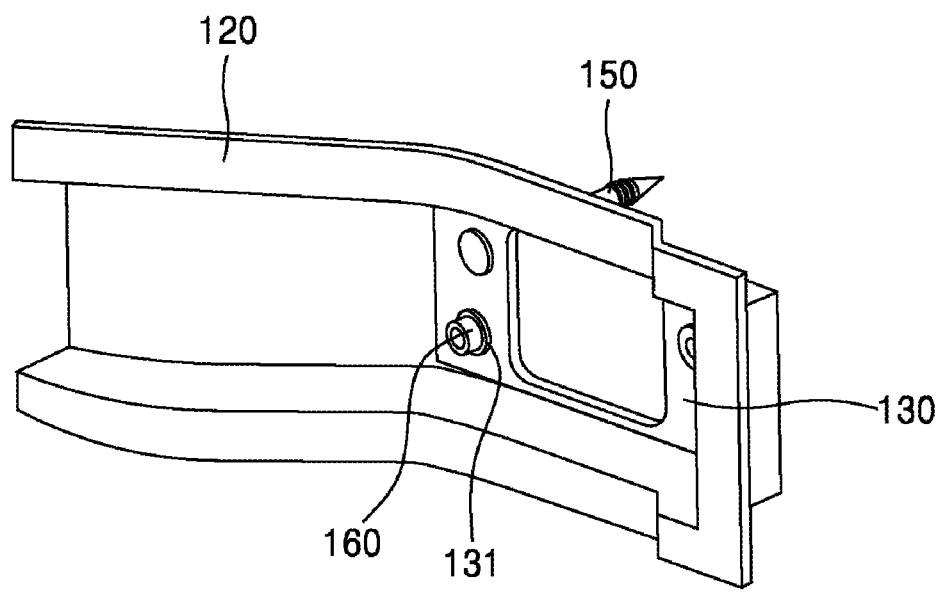
FIG. 6 is a view showing the stay member coupled with the fastening plate.
Figure 7:
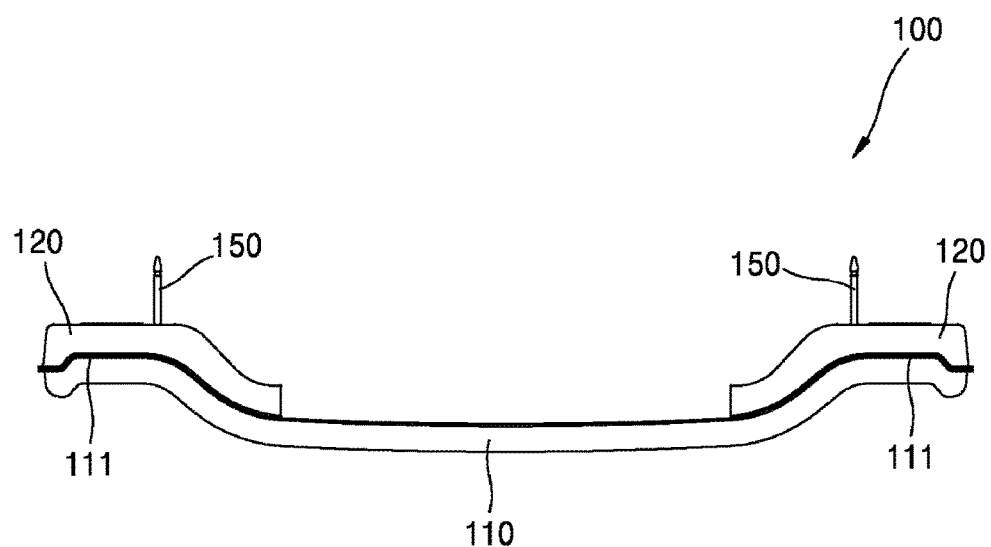
FIG. 7 is a plan view showing a plane of a beam for a bumper according to an exemplary embodiment of the present disclosure.

FIG. 1 is an exploded perspective view of a beam for a bumper according to an exemplary embodiment of the present disclosure. FIG. 2 is a front view of the beam for a bumper according to the exemplary embodiment of the present disclosure. FIG. 3 is an enlarged view of portion A of FIG. 2. FIG. 4 is a cross-sectional view taken along line IV-IV of FIG. 3. FIG. 5 is a view showing another example of coupling between a coupling portion and a stay member. FIG. 6 is a view showing the stay member coupled with the fastening plate. FIG. 7 is a plan view showing a plane of a beam for a bumper according to an exemplary embodiment of the present disclosure.

Referring to FIGS. 1 to 3, a beam 100 for a bumper according to an exemplary embodiment of the present disclosure includes a rail member 110, a stay member 120, and a fastening plate 130.

According to the exemplary embodiment of the present disclosure, the beam 100 is a back beam for a rear bumper provided at the rear side of a vehicle.

The rail member 110 is provided on the rear side of a bumper cover (not shown) and installed in the body of a vehicle (not shown). The rail member 110 is deformed when there is a collision at the rear side of the vehicle to absorb impact energy, and transmits the impact evenly over the entire rear side of the body of the vehicle.

According to the exemplary embodiment of the present disclosure, the rail member 110 is formed by processing continuous fiber thermoplastics (CFT) into a rail shape.

Specifically, the rail member 110 is entirely formed of the continuous fiber thermoplastics (CFT) in a rail shape, instead of only a part of the rail member 110 being formed of the composite material including the continuous fiber thermoplastics.

The continuous fiber thermoplastics (CFT) is a composite material of plastic in which a reinforcing fiber such as glass fiber and carbon fibers is embedded in the continuous phase. It exhibits excellent mechanical strength, rigidity and impact resistance and maintains its physical properties even at a low temperature.

The rail member partially or entirely made of a plastic material such as thereto plastic olefin (TPO) has a problem in that its physical properties are degraded at a low temperature.

In contrast, the rail member 110 according to the exemplary embodiment of the present disclosure is entirely formed of the continuous fiber thermoplastics (CFT), so that the rail member 110 exhibits excellent mechanical strength, rigidity and impact resistance, and its physical properties are not degraded at a low temperature.

On either side portion of the rail member 110 in the longitudinal direction, a coupling portion 111 having a flange-shaped coupling surface is formed.

The stay member 120 is provided at either side portion of the rail member 110 in the longitudinal direction so that it is positioned between the body of the vehicle and the rail member 110 and is coupled with the coupling portion 111.

The stay member 120 may be formed by processing the continuous fiber thermoplastics (CFT) into a stay shape, like the rail member 110.

While the continuous fiber thermoplastics (CFT) have advantages in mechanical strength, rigidity and impact resistance, it is not easy to form its shape. Accordingly, it requires too much cost and time to produce the rail member 110 and the stay member 120 as a single piece only with the continuous fiber thermoplastics (CFT).

For this reason, according to the exemplary embodiment of the present disclosure, the rail member 110 and the stay member 120 are formed separately and coupled with each other, to thereby produce the beam 100 having excellent mechanical strength, rigidity, impact resistance and low-temperature characteristics.

A flange-shaped coupling surface is formed at the periphery of the stay member 120 in parallel with the coupling surface of the coupling portion 111.

The stay member 210 having the coupling surface may be coupled with the rail member 110 such that the coupling surface formed on its periphery comes in contact with the coupling surface of the coupling portion 111.

The coupling portion 111 and the stay member 120 may be coupled to each other in various ways, for example, by fusing or riveting them while their coupling surfaces are in contact with each other.

According to the exemplary embodiment of the present disclosure, the coupling portion 111 is coupled with the stay member 120 by riveting, for example.

According to this, the beam 100 for a bumper according to the exemplary embodiment of the present disclosure may further include a fastening member 140. The fastening member 140 is used to couple the coupling portion 111 with the stay member 120 as their coupling surfaces are in contact with either.

For example, the fastening member 140 may include a rivet that is pressed into the coupling surfaces between the coupling portion 111 and the stay member 120 from outside the coupling portion 111 toward the stay member 120.

As shown in FIG. 4, the fastening member 140 may be deformed such that its one end pressed in toward the stay member 120 widens outwardly to penetrate into the stay member 120, to thereby couple the coupling portion 111 with the stay member 120.

As another example, as shown in FIG. 5, the fastening member 140 may include a rivet that passes through a through hole h formed through the coupling portion 111 and the stay member 120, to thereby couple the coupling portion 111 with the stay member 120.

By pressing the opposite end of the fastening member 140 that penetrates the coupling portion 111 and the stay member 120 via the through hole h from outside the coupling portion 111 or the stay member 120 to thereby couple the coupling portion 111 with the stay member 120, it is possible to further enhance the coupling force between the rail member 110 and the stay member 120.

Since the rail member 110 is coupled with the stay member 120 by the riveting using the fasten member 140, the rail member 110 and the stay member 120 can be assembled quickly and easily. Therefore, it is possible to avoid an increase in the cost and time required for producing the beam 100 for a bumper.

Further, as the stay member 120 for coupling the rail member 110 with the body of the vehicle, as well as the rail member 110, is also made of the continuous fiber thermoplastics (CFT), instead of a heavy metal or a plastic material that has low rigidity and cannot maintain its physical properties at a low temperature, it is possible to produce the beam 100 having excellent mechanical strength, rigidity, impact resistance, and low-temperature characteristics, while reducing the weight.

As shown in FIGS. 1 and 6, the fastening plate 130 is provided between the coupling portion 111 and the stay member 120.

According to the exemplary embodiment of the present disclosure, a space for installing the fastening plate 130 is formed between the coupling portion 111 and the stay member 120.

The fastening plate 130 is coupled to the stay member 120 in the space formed between the coupling portion 111 and the stay member 120 so that it enhances the rigidity of the coupling surface of the stay member 130 coupled with the body of the vehicle and strengthens the supporting force of the members that couple the stay member 130 with the body.

In addition, the beam 100 according to the exemplary embodiment of the present disclosure may further include body fastening members 150 and 160, which passes through the fastening plate 130 and the coupling portion part 111.

Further, the fastening plate 130 is formed with a fastening hole 131 through which the members 150 and 160 pass.

The members 150 and 160 may include at least one of a guide pin 150 and a pop nut 160.

The head of the guide pin 150 is coupled to the fastening plate 130 while the other side of the guide pin 150 passes through the fastening hole 131 to protrude toward the body of the vehicle.

The guide pin 150 may be inserted into a guide hole (not shown) formed in the body of the vehicle to guide the position where the beam 100 is installed on the body.

The pop nut 160 may be coupled to the fastening plate 130 by passing through the fastening hole 131 and may have a screw thread formed therein for screw fastening. The pop nut 160 may be coupled to the fastening plate 130 by riveting or by screw fastening using a screw thread formed on its outer side.

The pop nut 160 may be involved in the coupling between the body of the vehicle and the beam 100 by being coupled with a bolt member (not shown) provided for coupling the body with the beam 100.

As shown in FIGS. 2 and 7, the beam 100 according to the exemplary embodiment of the present disclosure can work as a back beam that can be installed on the body of a vehicle with sufficient coupling force even though both the rail member 110 and the stay member 120 are entirely made of the continuous fiber thermoplastics (CFT).

According to the beam 100 of the above-described exemplary embodiment, the rail member 110 and the stay member 120 are entirely formed using only the continuous fiber thermoplastics (CFT), so that the beam 100 that has excellent rigidity and impact resistance while maintaining its physical properties even at a low temperature.

Also, in the beam 100 of the above-described exemplary embodiment, the rail member 110 and the stay member 120 are entirely made of the continuous fiber thermoplastics (CFT) that is light, so that a beam that is light and strong while having excellent mechanical strength, rigidity, impact resistance and low-temperature characteristics can be provided.

Although the exemplary embodiments of the present disclosure have been described with reference to the accompanying drawings, these are merely illustrative. It will be appreciated by those skilled in the art that various modifications and equivalents are possible without departing from the scope of the present disclosure. Accordingly, the true scope sought to be protected is defined solely by the claims.

DESCRIPTION OF REFERENCE NUMERALS

100: Beam for Bumper
110: Rail Member
111: Coupling Portion
120: Stay Member
130: Fastening Plate
131: Fastening Hole
140: Fastening Member
150: Guide Pin
160: Pop Nut

What is claimed is:

1. A beam for a bumper comprising:
a rail member installed on a body of a vehicle, wherein the rail member is formed by processing a continuous fiber thermoplastics (CFT) into a rail shape and has a coupling portion having a flange-shaped coupling surface at its either side portion in a longitudinal direction;
a stay member disposed at the either side portion of the rail member in the longitudinal direction so that it is located between the body and the rail member to be coupled with the coupling portion, wherein the stay member is formed by processing the continuous fiber thermoplastics (CFT) into a stay shape, and is coupled with the rail member such that a coupling surface having a flange shape in parallel with the coupling surface of the coupling portion is coupled with it; and
a fastening plate disposed between the coupling portion and the stay member to enhance rigidity of the coupling surface of the stay member coupled with the body.

2. The beam of claim 1, wherein the coupling portion and the stay member are coupled with each other by fusing or riveting them as the coupling surfaces are in contact with each other.

3. The beam of claim 1, further comprising:
a fastening member for coupling the coupling portion and the stay member with each other as the coupling surfaces are in contact with each other, wherein the fastening member comprises a rivet, wherein the rivet is pressed into the coupling surfaces between the coupling portion and the stay member from outside the coupling portion toward the stay member, and wherein an end of the pressed rivet widens outwardly to penetrate into the stay member to couple the coupling portion with the stay member.

4. The beam of claim 1, further comprising:
a body fastening member for penetrating the fastening plate and the coupling portion, wherein a fastening hole through which the body fastening member passes is formed in the fastening plate.

5. The beam of claim 4, wherein the body fastening member comprises a guide pin coupled to the fastening plate and protruding toward the body through the fastening hole and/or a pop nut coupled to the coupling portion and the fastening plate through the fastening hole.

\* \* \* \* \*